United States Patent
Le Taillandier De Gabory

(10) Patent No.: US 10,567,078 B2
(45) Date of Patent: Feb. 18, 2020

(54) OPTICAL TRANSMITTER AND METHOD FOR CONTROLLING OPTICAL CARRIER FREQUENCY

(71) Applicant: NEC Corporation, Tokyo (JP)

(72) Inventor: Emmanuel Le Taillandier De Gabory, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/070,541

(22) PCT Filed: Jan. 18, 2016

(86) PCT No.: PCT/JP2016/000224
§ 371 (c)(1),
(2) Date: Jul. 17, 2018

(87) PCT Pub. No.: WO2017/125961
PCT Pub. Date: Jul. 27, 2017

(65) Prior Publication Data
US 2019/0020409 A1    Jan. 17, 2019

(51) Int. Cl.
*H04B 10/08*      (2006.01)
*H04B 10/079*     (2013.01)
(Continued)

(52) U.S. Cl.
CPC ....... *H04B 10/07957* (2013.01); *H04B 10/50* (2013.01); *H04J 14/02* (2013.01)

(58) Field of Classification Search
CPC .......................... H04B 10/07957; H04B 10/50; H04B 10/506; H04B 10/572; H04B 10/0775;
(Continued)

(56) References Cited

U.S. PATENT DOCUMENTS 4,997,277 A * 3/1991 Horiguchi ............ G01M 11/319
                                                  356/73.1
6,493,091 B2 * 12/2002 Kourogi ............. G01N 21/4795
                                                  356/489
(Continued)

FOREIGN PATENT DOCUMENTS

| EP | 2 613 460 A1 | 7/2013 |
| JP | 2014-209685 A | 11/2014 |
| JP | 2015-106829 A | 6/2015 |

OTHER PUBLICATIONS

Written Opinion of the International Searching Authority of PCT/JP2016/000224 dated Mar. 1, 2016.
(Continued)

*Primary Examiner* — Hibret A Woldekidan
(74) *Attorney, Agent, or Firm* — Sughrue Mion, PLLC

(57) ABSTRACT

An optical transmitter using multiplexed optical signals increases in cost and in size in order to control an optical carrier frequency with high precision, therefore, an optical transmitter according to an exemplary aspect of the invention includes optical signal generating means for adding a first optical component to a first optical carrier and adding a second optical component to a second optical carrier; multiplexing means for multiplexing the first optical carrier and the second optical carrier to generate a multiplexed optical signal; monitoring means for monitoring the multiplexed optical signal to detect a monitor signal having a difference frequency between the first optical component and the second optical component; and controlling means for controlling a carrier frequency of at least one of the first optical carrier and the second optical carrier according to the monitor signal.

20 Claims, 8 Drawing Sheets

(51) Int. Cl.
  *H04B 10/50* (2013.01)
  *H04J 14/02* (2006.01)

(58) Field of Classification Search
  CPC .......... H04B 10/0795; H04B 10/50575; H04B 10/564; H04B 10/0779; H04B 10/548; H04B 10/503; H04J 14/02; H04J 14/0221; H04J 14/0298; H04J 14/0212
  USPC ....... 398/25, 34, 45, 48, 68, 79, 85, 69, 187
  See application file for complete search history.

(56) References Cited

U.S. PATENT DOCUMENTS

| | | | | |
|---|---|---|---|---|
| 6,522,911 | B1* | 2/2003 | Toida | A61B 5/0059 356/319 |
| 7,522,285 | B2* | 4/2009 | Huhse | G01R 23/16 356/477 |
| 7,668,411 | B2* | 2/2010 | Davies | G01H 9/004 385/12 |
| 8,385,746 | B2* | 2/2013 | Itou | H04B 10/29 398/140 |
| 8,629,980 | B2* | 1/2014 | Ozeki | G01N 21/65 356/301 |
| 8,804,231 | B2* | 8/2014 | Savchenkov | H01S 5/0687 359/337.1 |
| 8,965,202 | B2* | 2/2015 | Sone | H04B 10/07955 398/38 |
| 9,109,954 | B2* | 8/2015 | Ozeki | G01N 21/65 |
| 9,319,141 | B2* | 4/2016 | Arikawa | H04B 10/299 |
| 9,496,953 | B2 | 11/2016 | Nakagawa et al. | |
| 10,205,528 | B2* | 2/2019 | Le Taillandier De Gabory | H04B 10/588 |
| 10,313,017 | B2* | 6/2019 | Tanimura | H04Q 11/0066 |
| 10,361,779 | B2* | 7/2019 | Arikawa | H04B 10/2581 |
| 2012/0170937 | A1* | 7/2012 | Van Leeuwen | H04B 10/07957 398/76 |
| 2014/0105596 | A1* | 4/2014 | Oda | H04B 10/564 398/34 |
| 2014/0140692 | A1 | 5/2014 | Oda et al. | |
| 2014/0161443 | A1* | 6/2014 | Zhou | H04J 14/021 398/27 |
| 2015/0333863 | A1* | 11/2015 | Fujita | H04B 10/07955 398/34 |
| 2016/0036533 | A1* | 2/2016 | Nakashima | G02F 1/0123 398/187 |
| 2019/0140418 | A1* | 5/2019 | Le Taillandier De Gabory | H01S 3/06758 |

OTHER PUBLICATIONS

International Search Report of PCT/JP2016/000224 dated Mar. 1, 2016.
Koji Igarashi et al., "Frequency Stabilization of Multiple Semiconductor Lasers for Nyquist-WDM Transmission Systems," Optical Fiber Communication Conference and Exposition and the National Fiber Optic Engineers Conference (OFC/NFOEC), Mar. 17, 2013, 3 pages.
Communication dated May 7, 2019, from the Japanese Patent Office in counterpart application No. 2018-536525.

* cited by examiner

OPTICAL TRANSMITTER AND METHOD FOR CONTROLLING OPTICAL CARRIER FREQUENCY

TECHNICAL FIELD

The present invention relates to optical transmitters and methods for controlling an optical carrier frequency and, in particular, to an optical transmitter and a method for controlling an optical carrier frequency using digital signal processing techniques and multiplexed optical signals.

BACKGROUND ART

In order to increase channel rates despite limitations of bandwidth of analog to digital converters and digital to analog converters, as well as digital signal processors (DSP), multiplexing several subcarriers inside one channel is being used. For instance, 400 Gb/s signals are realized recently with two subcarriers at 200 Gb/s rate each. Here, these two subcarriers are optical signals which are multiplexed in frequency and considered as part of one channel.

Unmodulated spectral spacing between several channels or subcarriers is not used to transmit information. Accordingly, squeezing channels and reducing the space between subcarriers or carriers is an efficient way to increase the data transmitted in optical systems, and therefore to reduce CAPEX (capital expenditure) investment. For instance, using Nyquist spectrally shaped subcarriers can improve spectral efficiency and therefore channel capacity. In principle, it enables to reduce the bandwidth occupied by a subcarrier down to the symbol rate of the channel, and therefore to increase the spectral efficiency and in fine the capacity of the optical system if more subcarriers are multiplexed in the same bandwidth. Nyquist Spectrally shaped subcarriers can be called Nyquist channels, Nyquist WDM (wavelength division multiplexing), Nyquist shaped, or Nyquist pulse channels, depending on sources.

Moreover, a shaping technique for subcarriers is known as Sub-Nyquist, which can be called Faster-Than-Nyquist, Super-Nyquist, or optical time frequency packing, depending on sources. It enables to reduce the bandwidth occupied by the subcarrier or channel below its symbol rate. In such techniques, the spacing between subcarriers or channels becomes very tight, and a very little space is left unused between subcarriers, typically a few gigahertzes for current optical systems.

Optical telecom systems are used over long period of time, typically more than ten years in changing environment. Such constraint has an influence on the characteristics of the components of the system including light sources. For instance, tunable lasers can be used to generate subcarriers or channels in optical networks with frequency stability from ±1.25 GHz to ±2.5 GHz, specified at end of life, depending on conditions. The frequencies, over which two such lasers are susceptible to relative variation in that cases, are respectively 2.5 GHz and 5 GHz, each of which is larger than the spacing between channels or subcarriers in ultra-dense systems. In such an eventuality, neighboring channels of subcarriers would overlap, which causes linear crosstalk among them, lowering the quality of received signal, and finally reducing system performance or transmission distance. The very high frequency of optical carriers, however, excludes the possibility to monitor directly the deviation of frequency of channels and relative deviations between channels.

An example of a multicarrier optical transmitter is described in patent literature 1 (PTL1) which can control a frequency interval between subcarriers. The multicarrier optical transmitter described in PTL1 includes transmission CW (continuous wave) light sources, monitor light extraction means, light vector modulation means, optical multiplexing means, frequency interval monitor means, and driving signal generating means.

The transmission CW light sources output the CW light having optical frequency corresponding to each subchannel. The monitor light extraction means tap part of light output from the transmission CW light sources and send it to the frequency interval monitor means as monitor light. The frequency interval monitor means detects the frequency interval between the output light of the transmission CW light sources from the monitor light, generates frequency interval information including beat signals from the detected frequency interval, and sends it to the driving signal generating means. The driving signal generating means generates driving signals for the light vector modulation means based on the frequency interval information and transmission data signals inputted from the outside. The light vector modulation means generate subchannel signals based on the inputted driving signals and the output light of the transmission CW light sources so that the subchannel signals may have a predetermined frequency interval. The optical multiplexing means multiplexes the subchannel signals output from the light vector modulation means. The multiplexed subchannel signals are output as multicarrier optical signals from an output port.

It is said that the multicarrier optical transmitter described in PTL1 can perform feedforward compensation for a deviation of the frequency interval between subcarriers from an intended value.

CITATION LIST

Patent Literature

[PTL 1]
Japanese Patent Application Laid-Open Publication No. 2014-209685

SUMMARY OF INVENTION

Technical Problem

The multicarrier optical transmitter described in PTL1 monitors respective light beams output from the transmission CW light sources before frequency-multiplexing them. It is required, therefore, to use a lot of monitoring components such as a plurality of monitor light extraction means, optical beam splitters, optical couplers, and balanced optical receivers. That is to say, the multicarrier optical transmitter described in PTL1 is a high-cost device and needs a large footprint.

In addition, the multicarrier optical transmitter described in PTL1 monitors light beams at a large frequency difference corresponding to a frequency interval between subcarriers. It is required, therefore, to use monitoring components having high specification such as balanced optical receivers with a wide bandwidth corresponding to a frequency interval between subcarriers. That is to say, the multicarrier optical transmitter described in PTL1 is a high-cost device.

As mentioned above, there has been a problem that an optical transmitter using multiplexed optical signals increases in cost and in size in order to control an optical carrier frequency with high precision.

An exemplary object of the invention is to provide an optical transmitter and a method for controlling an optical carrier frequency, which solve the above-mentioned problem that an optical transmitter using multiplexed optical signals increases in cost and in size in order to control an optical carrier frequency with high precision.

Solution to Problem

A method for controlling an optical carrier frequency according to an exemplary aspect of the invention includes adding a first optical component to a first optical carrier; adding a second optical component to a second optical carrier; multiplexing the first optical carrier and the second optical carrier to generate a multiplexed optical signal; monitoring the multiplexed optical signal to detect a monitor signal having a difference frequency between the first optical component and the second optical component; and controlling a carrier frequency of at least one of the first optical carrier and the second optical carrier according to the monitor signal.

An optical transmitter according to an exemplary aspect of the invention includes optical signal generating means for adding a first optical component to a first optical carrier and adding a second optical component to a second optical carrier;

multiplexing means for multiplexing the first optical carrier and the second optical carrier to generate a multiplexed optical signal; monitoring means for monitoring the multiplexed optical signal to detect a monitor signal having a difference frequency between the first optical component and the second optical component; and controlling means for controlling a carrier frequency of at least one of the first optical carrier and the second optical carrier according to the monitor signal.

Advantageous Effects of Invention

An exemplary advantage according to the present invention is that an optical transmitter using multiplexed optical signals decreases in cost and in size which is able to control an optical carrier frequency with high precision.

DESCRIPTION OF EMBODIMENTS

Figure 1:
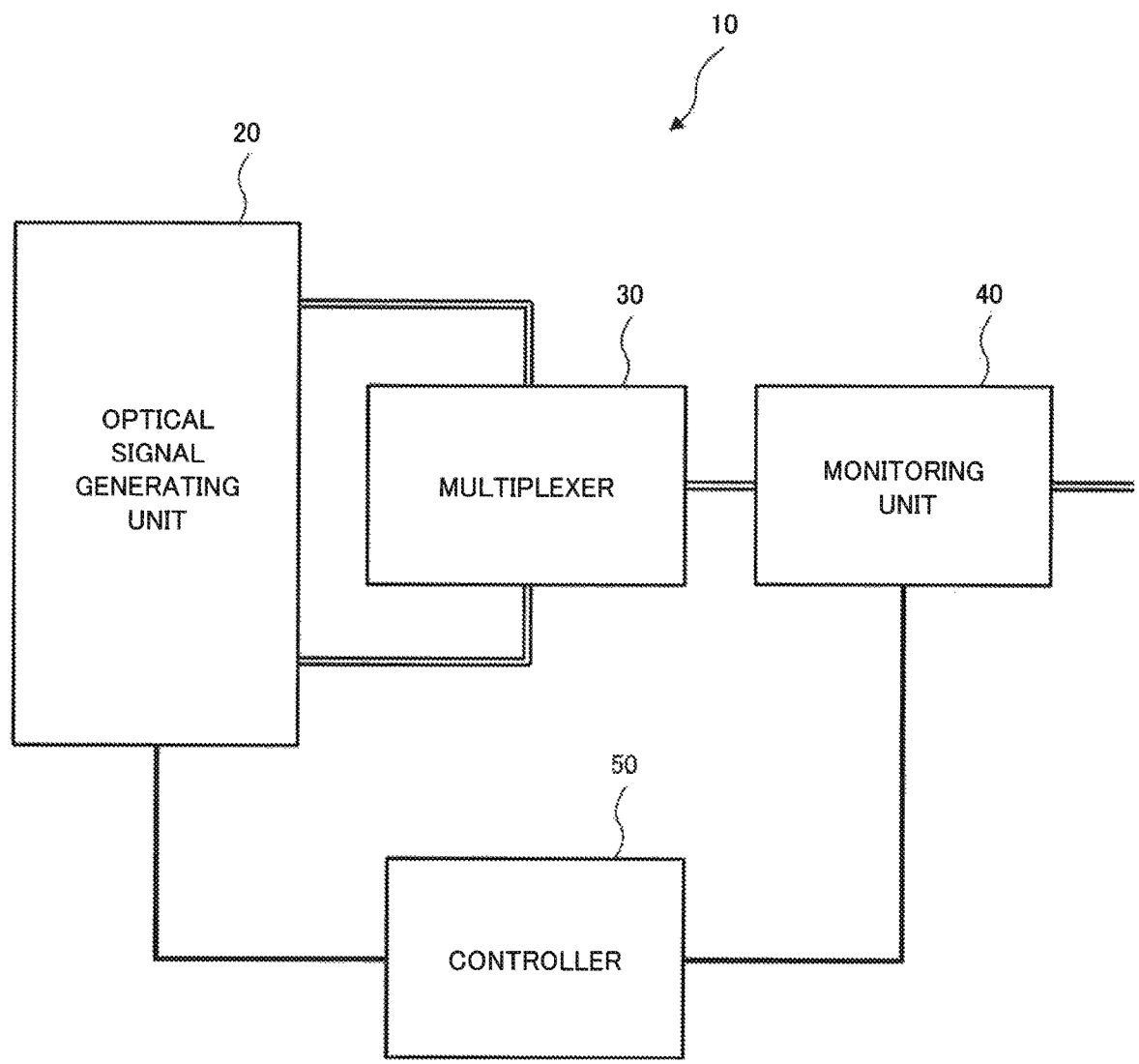
FIG. 1 is a block diagram illustrating the configuration of an optical transmitter in accordance with a first exemplary embodiment of the present invention.

The exemplary embodiments of the present invention will be described with reference to drawings below. The arrow direction in the drawings denotes an example of direction and does not limit the direction of signals between blocks.

[A First Exemplary Embodiment]

FIG. 1 is a block diagram illustrating the configuration of an optical transmitter in accordance with a first exemplary embodiment of the present invention. The optical transmitter 10 includes an optical signal generating unit 20 as an optical signal generating means, a multiplexer 30 as a multiplexing means, a monitoring unit 40 as a monitoring means, and a controller 50 as a controlling means.

The optical signal generating unit 20 adds a first optical component to a first optical carrier and adds a second optical component to a second optical carrier. The multiplexer 30 multiplexes the first optical carrier and the second optical carrier to generate a multiplexed optical signal. The monitoring unit 40 monitors the multiplexed optical signal to detect a monitor signal having a difference frequency between the first optical component and the second optical component. And the controller 50 controls a carrier frequency of at least one of the first optical carrier and the second optical carrier according to the monitor signal.

The optical transmitter 10 can be implemented with a few additional resources and with a small footprint and enables to precisely control the central frequency of multiplexed optical signals. That is to say, the optical transmitter 10 using multiplexed optical signals in accordance with the present exemplary embodiment decreases in cost and in size, and is able to control an optical carrier frequency with high precision. Accordingly, it becomes possible to avoid linear crosstalk between neighboring optical signals, and therefore increase the quality of received signals during the total life time of the communication system.

The optical signal generating unit 20 may generate a first data stream by adding a first frequency component having a first frequency to a binary data stream, and modulate the first optical carrier based on the first data stream. The optical signal generating unit 20 may generate a second data stream by adding a second frequency component having a second frequency to a binary data stream, and modulate the second optical carrier based on the second data stream.

The controller 50 may control the carrier frequency so as to maximize the monitor signal.

The first optical component may include an optical component having an optical frequency obtained by adding the first frequency to a central frequency of the first optical carrier, but exclude an optical component having an optical frequency obtained by subtracting the first frequency from the central frequency of the first optical carrier. And the second optical component may include an optical component having an optical frequency obtained by subtracting the second frequency from a central frequency of the second optical carrier which is larger than the central frequency of the first optical carrier, but exclude an optical component having an optical frequency obtained by adding the second frequency to the central frequency of the second optical carrier.

Next, a method for controlling an optical carrier frequency in accordance with the present exemplary embodiment will be described.

In the method for controlling an optical carrier frequency, a first optical component is added to a first optical carrier, and a second optical component is added to a second optical carrier. After that, the first optical carrier and the second optical carrier are multiplexed to generate a multiplexed optical signal. Then the multiplexed optical signal is monitored to detect a monitor signal having a difference frequency between the first optical component and the second optical component. A carrier frequency of at least one of the first optical carrier and the second optical carrier is controlled according to the monitor signal.

According to the above-mentioned method for controlling an optical carrier frequency, it becomes possible for an optical transmitter using multiplexed optical signals to decrease in cost and in size, and to control an optical carrier frequency with high precision.

[A Second Exemplary Embodiment]

Next, a second exemplary embodiment of the present invention will be described.

Figure 2:
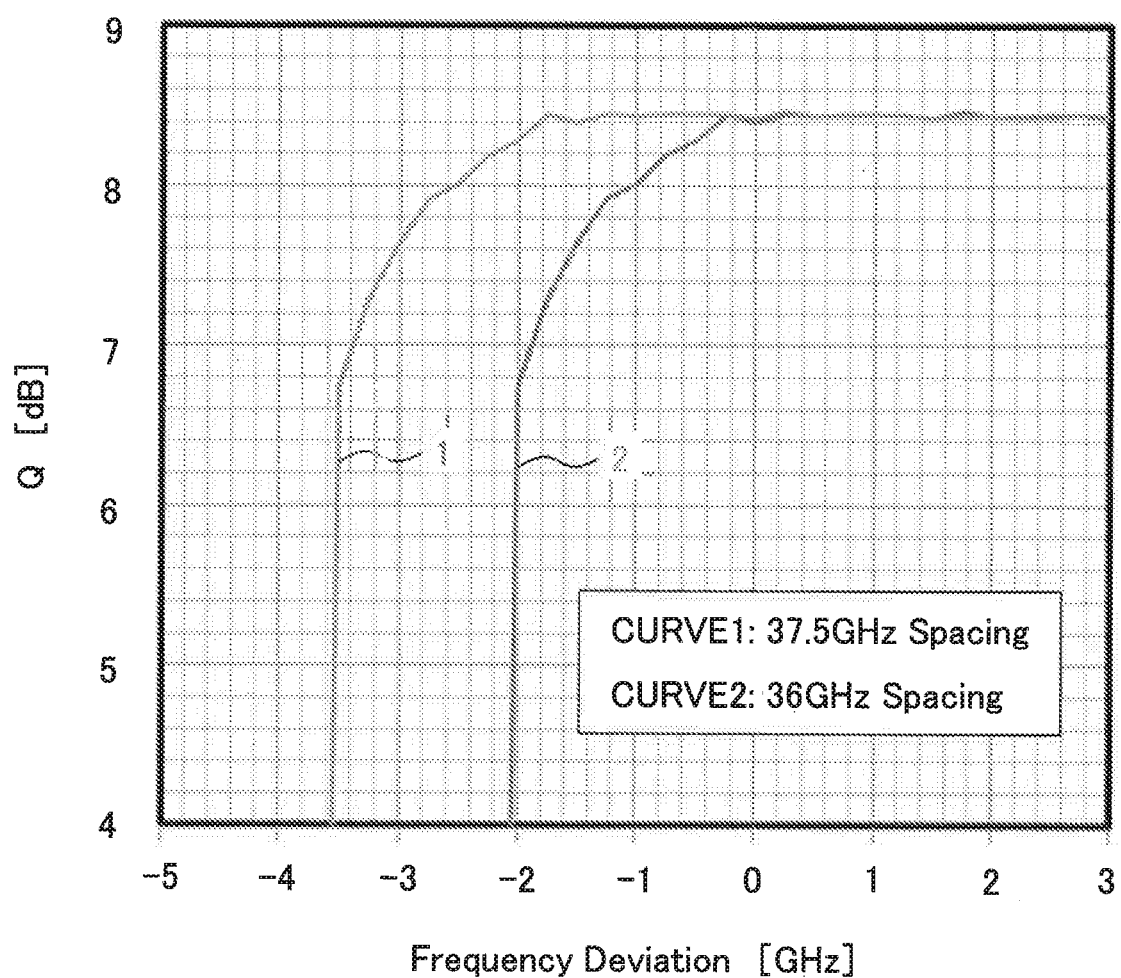
FIG. 2 is a diagram illustrating the simulation results of optical transmission using multiplexed optical signals.

First, simulation results of optical transmission using multiplexed optical signals are shown. FIG. 2 illustrates the simulation results of optical transmission using multiplexed optical signals with linear crosstalk between neighboring optical signals.

The simulated optical channel is composed of two subcarriers. Each subcarrier is modulated with 34 Gbaud PM-16QAM (polarization-multiplexed 16 quadrature amplitude modulation) accounting for 200 Gb/s payload with training symbols and FEC (forward error correction) encoding. The channel payload is therefore 400 Gb/s. Each subcarrier is a Nyquist spectrally shaped subcarrier with root raised cosine filtering at the transmitter and root raised cosine adapted filtering at the receiver.

The curve 1 represents the case of 37.5 GHz spacing between subcarriers, and the curve 2 represents the case of 36 GHz spacing between subcarriers. Each curve represents the received signal quality after transmission with OSNR (optical signal-to-noise ratio) of 25 dB/0.1 nm for the higher frequency subcarrier. Each curve is plotted against the frequency deviation of the laser for generating the subcarrier.

For a frequency deviation of −2.5 GHz, the penalty of the received quality is already 0.4 dB for the curve 1. This highlights that even with a current laser for 400 Gb/s, the maximal laser deviation authorized by the specifications mentioned above is already non negligible. For even tighter subcarriers at 36 GHz spacing represented by the curve 2, the same degradation is attained for a mere −1 GHz deviation, which is well below stricter specifications of current laser sources.

FIG. 2 illustrates that conventional technologies do not allow achieving optimal channel performance for tight optical signals over a lifetime of communication systems, and therefore for higher capacity systems using frequency multiplexed subcarriers with spectrally shaping multiplexed signals.

Figure 3:
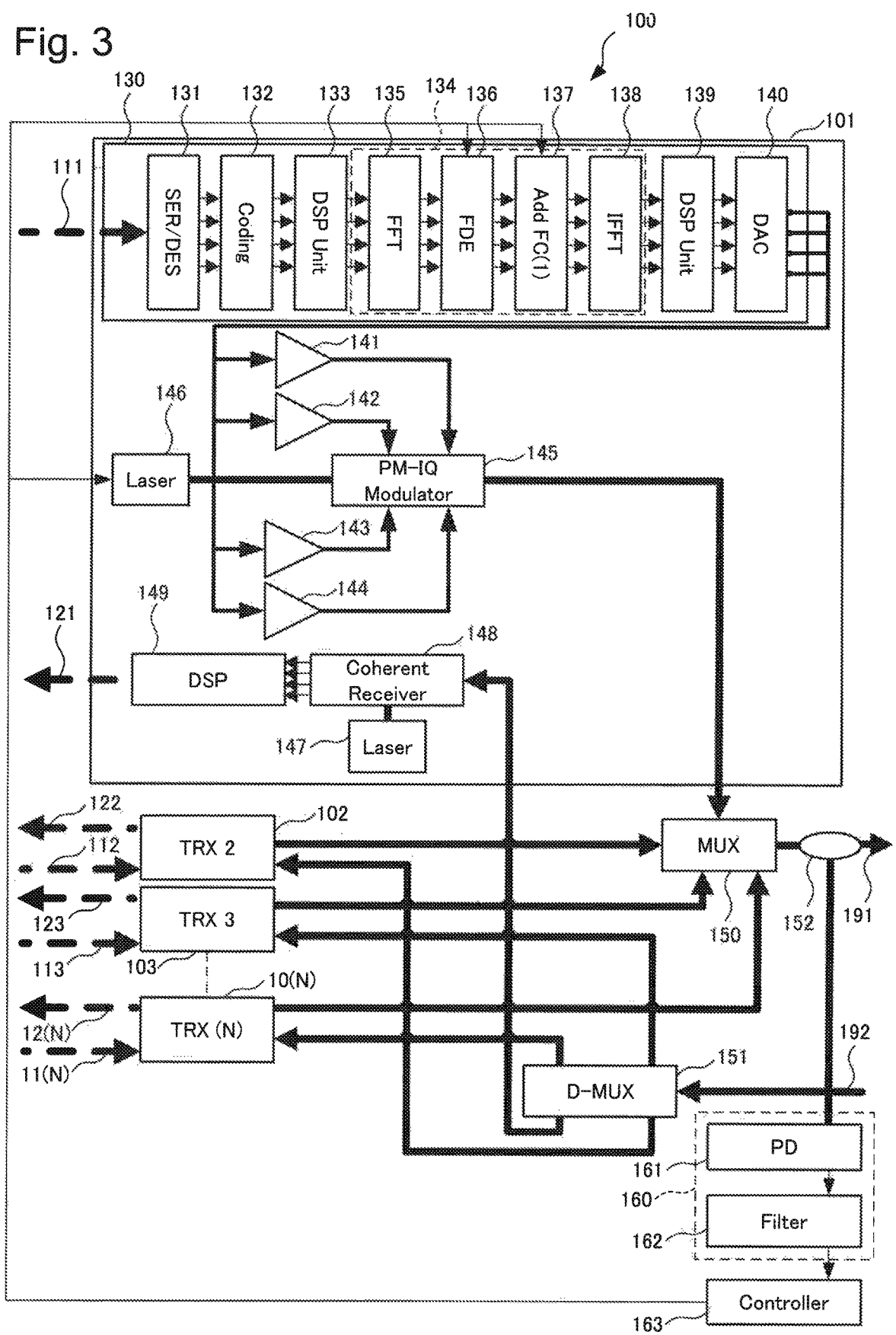
FIG. 3 is a block diagram illustrating the configuration of a transmission system in accordance with a second exemplary embodiment of the present invention.

FIG. 3 is a block diagram illustrating the configuration of a transmission system 100 according to a second exemplary embodiment of the present invention.

The transmission system 100 includes N pieces of identical transceivers, which are denoted with 101 for a first transceiver, 102 for a second transceiver, 103 for a third transceiver, and 10(N) for a N-th transceiver. The first transceiver 101 emits an optical signal according to a binary data stream 111 and generates a binary data stream 121 according to a received optical signal. Identically, the second transceiver 102 emits an optical signal according to a binary data stream 112 and generates a binary data stream 122 according to a received optical signal. The third transceiver 103 emits an optical signal according to a binary data stream 113 and generates a binary data stream 123 according to a received optical signal. Finally, the N-th transceiver 10(N) emits an optical signal according to a binary data stream 11(N) and generates a binary data stream 12(N) according to a received optical signal.

The optical signals generated by the transceivers 101 to 10(N) are multiplexed by a multiplexer 150. The multiplexer 150 can be an arrayed waveguide grating (AWG). Alternatively, the multiplexer 150 can be implemented with a wavelength selective switch (WSS) or an optical coupler. The output of the multiplexer 150 is tapped with an optical coupler 152 and its output 191 is transmitted through a transmission medium, which can be an optical fiber.

On the other side, an optical signal 192 is received from a transmission medium, which can be an optical fiber. The optical signal 192 is de-multiplexed with a de-multiplexer 151. The de-multiplexer 151 can be an AWG. Alternatively, the de-multiplexer 151 can be a WSS or an optical coupler. Each de-multiplexed optical signal is provided by the de-multiplexer 151 for one of the transceivers 101 to 10(N).

The transceiver 101 includes a DSP unit 130. The DSP unit 130 converts the binary data stream 111 into four analog signals, which are modulated on the optical carrier emitted by a laser 146 with a polarization multiplexed IQ (in phase and quardrature) modulator 145. Four linear drivers 141, 142, 143, and 144 ensure that the four analog signals generated by the DSP 130 have sufficient electrical amplitude for optimal modulation with the polarization multiplexed IQ modulator 145.

On the other side, the optical signal received by the transceiver 101 is provided for a coherent receiver 148, in which the optical signal is mixed with the local oscillation light provided by a laser 147. The four amplified electrical outputs of the coherent receiver 148 are demodulated by a receiver DSP 149, which generates accordingly the binary data stream 121. The DSP unit 130 and the receiver DSP 149 can be integrated into a single DSP.

The DSP unit 130 includes a serializer/de-serializer 131, which converts the binary data stream 111 into parallel tributaries to be processed by the DSP unit 130. A coder 132 encodes FEC codes on the logical data for error correction at the receiver. A DSP unit 133 performs various equalization operations in time domain. A frequency domain unit 134 performs equalization processing in frequency domain. The frequency domain unit 134 includes a fast Fourier transform unit 135, a tap filter 136 for frequency domain equalization, a special adding unit 137, and an inverse fast Fourier transform unit 138. A DSP unit 139 performs equalization in time domain on the generated digital data and linearization of the signal through a look up table. A digital-to-analog converter (DAC) 140 converts the processed digital signal into the four analog outputs of the DSP unit 130.

The special adding unit 137 adds a frequency component on the generated digital signal, and the frequency component is finally added to the optical signal modulated by the polarization multiplexed IQ modulator 145. The special adding unit 137 is used for generating a frequency component at the frequency FC1 on the signal output by the DSP unit 130. As a result, an optical component with an optical frequency of F1+FC1 is generated on the optical signal emitted by the transceiver 101, where F1 is the frequency of the carrier generated by the laser 146. Modules identical to the special adding unit 137 are implemented in the transceivers 102 to 10(n). Those modules add specific frequencies FC2, to FC(N), and accordingly generate optical components with respective optical frequencies of F2+FC2 to F(N)+FC(N), where F2 to F(N) are the frequencies of the optical carriers used by the transceivers 102 to 10(N).

The multiplexed optical signal tapped by the optical coupler 152 is monitored through a monitoring unit 160. The monitoring unit 160 includes a photodiode 161 with narrow bandwidth and a filter 162. The photodiode 161 converts the tapped optical signal into an electrical signal. The filter 162 filters the electrical signal. The filter 162 can be realized in digital domain with low clock speed ASIC (application specific integrated circuit) or FPGA (field-programmable gate array). Alternatively, the filter 162 can be realized in an analog manner.

A controller 163 controls the frequencies of the transceivers 101 to 10(N). The controller 163 commands the special adding unit 137, which imprints the frequency FC1, and the respective special adding units in the transceivers 102 to 10(N). The monitoring unit 160 and the controller 163 can be integrated on a transponder including the transceivers 101 to 10(N). Alternatively, the monitoring unit 160 and the controller 163 can be integrated in a node device or each of the transceivers 101 to 10(N).

Figure 4A:
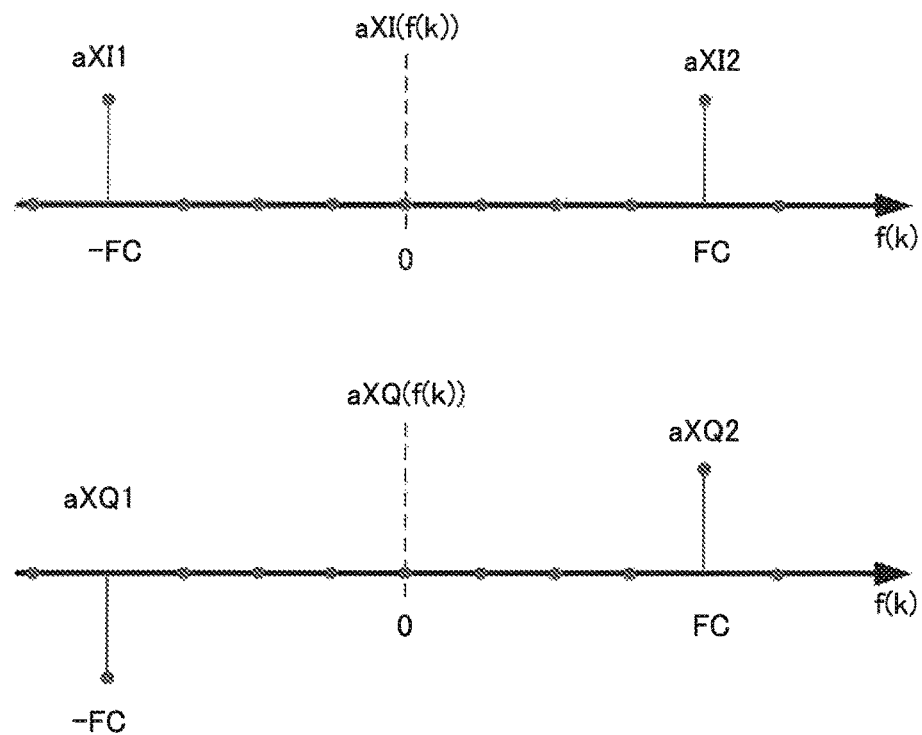
FIG. 4A is a schematic diagram illustrating setting parameters of the digital signal processing in the digital domains to imprint a frequency component on an optical signal.
Figure 4B:
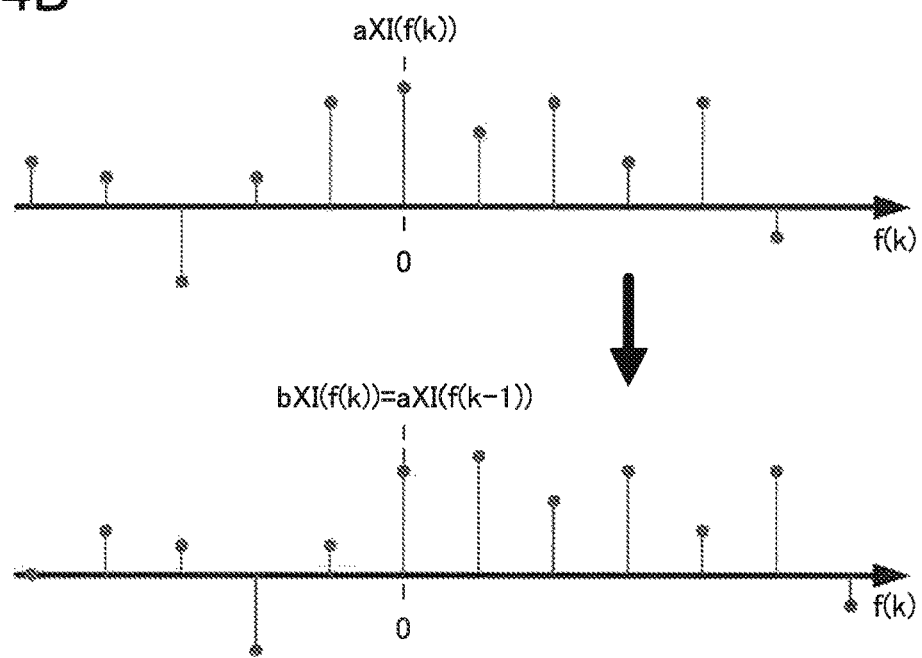
FIG. 4B is a schematic diagram illustrating setting parameters of the digital signal processing in the digital domains to adjust the frequency of an optical signal.

FIGS. 4A and 4B are schematic diagrams illustrating setting parameters of the digital signal processing in the digital domains. Specifically, FIG. 4A is a schematic diagram illustrating setting parameters of the digital signal processing to imprint a frequency component on an optical signal. FIG. 4A illustrates the coefficients in the frequency domain added by the special adding unit 137. The digital signal inside the DSP unit 130 has four tributaries represented by XI, XQ, YI, and YQ corresponding respectively to the in phase tributary of the X polarization, to the quadrature phase of the X polarization, to the in phase tributary of the Y polarization, and to the quadrature phase of the Y polarization.

The respective added components are represented by aXI(f(k)), aXQ(f(k)), aYI(f(k)), and aYQ(f(k)), where f(k) is the k-th signed frequency component of the signal. The frequency resolution of the tap filter 136 for frequency domain equalization is therefore Fres=f(k+1)−f(k). FIG. 4A illustrates the coefficients of the X polarization, namely aXI(f(k)) and aXQ(f(k)). The diagram for the Y polarization is identical with that for the X polarization.

For example, all coefficients of aXI are null except aXI(FC), and aXQ coefficients are equal to respective coefficients aXI. This enables to generate two frequencies at FC and −FC on the optical signal emitted by the transceiver 101.

Alternatively, as shown in FIG. 4A, for higher received signal quality, all coefficients of aXI are null except aXI (FC)=a and aXI(−FC)=a. On the quadrature phase tributary, all coefficients are null except aXQ(FC)=a and aXQ (−FC)=−a. This enables to generate a frequency component FC on only one side of the optical signal generated by the transceiver 101.

FIG. 4B is a schematic diagram illustrating setting parameters of the digital signal processing to adjust the frequency of an optical signal. The represented coefficients are the coefficients of the tap filter 136 for frequency domain equalization for the tributary XI. The coefficients aXI(f(k)) are set for equalizing the optical signal generated by the transceiver 101. After a certain time, the special adding unit 137 modifies the coefficients of the tap filter 136 with new set of coefficients bXI(f(k))=aXI(f(k−kb)). The same operation is performed simultaneously on the coefficients of the tributaries XQ, YI, and YQ. This results in a shift DFb=b*Fres on the optical signal. Such frequency shifting in the digital domain presents the advantage of high speed and very precise adjustment, independent of component tolerance to changes in environmental conditions such as temperature or ageing. Therefore such scheme can be adapted to high precision frequency adjustment for tightly spaced optical signals.

Figure 5A:
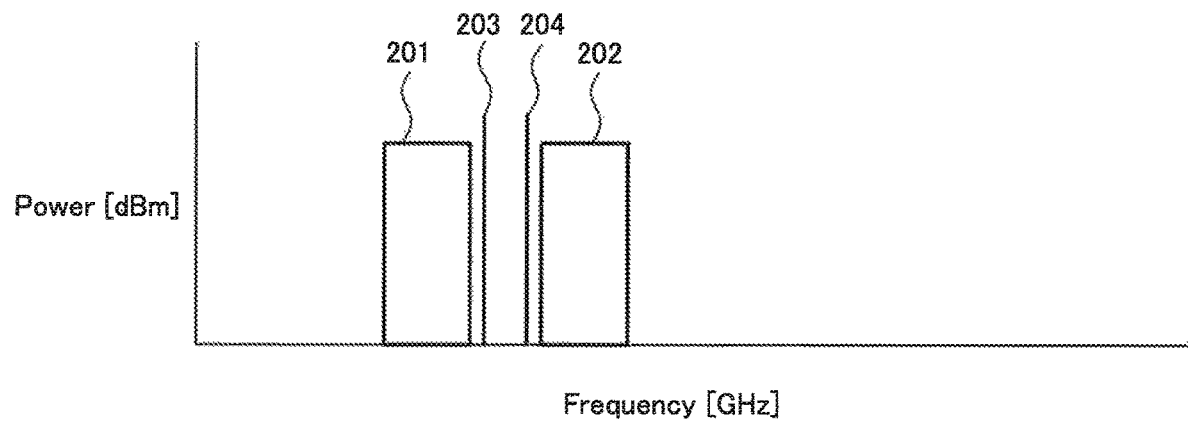
FIG. 5A is a diagram illustrating an optical spectrum of optical signals with imprinted frequency components for the case of two subcarriers.
Figure 5B:
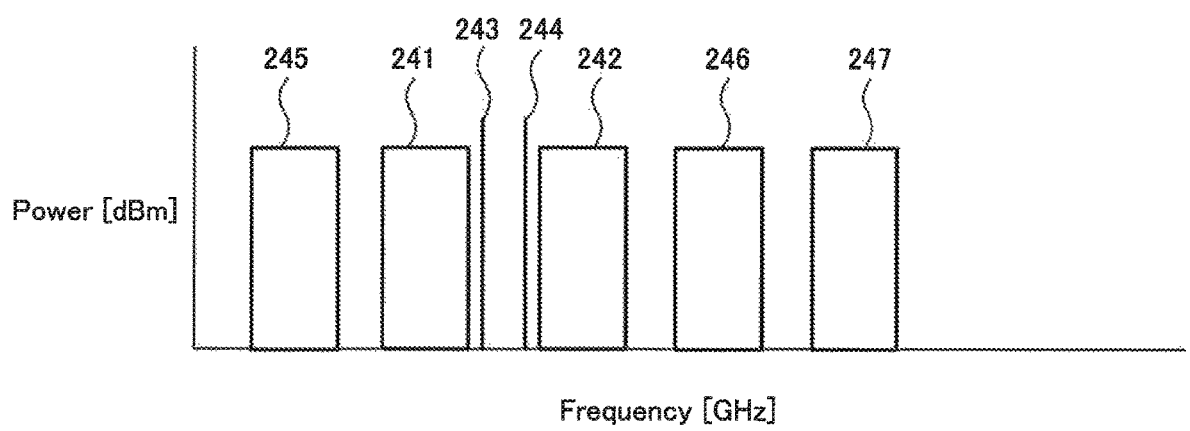
FIG. 5B is a diagram illustrating an optical spectrum of optical signals with imprinted frequency components for the case of five subcarriers.

FIG. 5A and 5B are diagrams illustrating optical spectrums of optical signals with imprinted frequency components according to the present exemplary embodiment. Specifically, FIG. 5A is an optical spectrum of optical signals with imprinted frequency components for the case of two subcarriers. In this case, a curve 201 represents the optical output of the transceiver 101 with 34 Gbaud PM-16QAM which is a Nyquist spectrally shaped optical signal enabled by root raised cosine filtering. Similar filtering is used for adapted filtering at the receiver. Similarly, a curve 202 represents the output of the transceiver 102, which emits the same format and baud rate subcarrier as that of the transceiver 101. The spacing between these channels is set to 37.5 GHz nominally. A frequency component 203 is imprinted by the DSP unit 130 in the transceiver 101 at the frequency 17.5 GHz from the center frequency of the channel. Similarly, the DSP unit in the transceiver 102 imprints a frequency component 204 on the optical output 202 of the transceiver 102 at the frequency −17.5 GHz from the center of the subcarrier emitted by the transceiver 102. Here, the imprinted frequencies are chosen between half of the symbol rate of the subcarrier and half of the spacing of the subcarriers.

FIG. 5B is an optical spectrum of optical signals with imprinted frequency components for the case of five subcarriers. In this case, a curve 241 represents the optical output of the transceiver 101 with 34 Gbaud PM-16QAM which is a Nyquist spectrally shaped optical signal enabled by root raised cosine filtering with a roll-off rate of 0.1 at the transmitter. Similar filtering is used for adapted filtering at the receiver. Similarly, respective curves 242, 245, 246, and 247 represent the outputs of the respective transceivers 102, 103, 104, and 105, which emit the same format and baud rate subcarriers as that of the transceiver 101. The spacing between these channels is set to 37.5 GHz nominally. A frequency component 243 is imprinted by the DSP unit 130 in the transceiver 101 at the frequency 17.5 GHz from the center frequency of the channel. Similarly, the DSP unit in the transceiver 102 imprints a frequency component 244 on the optical output 242 of the transceiver 102 at the frequency −17.5 GHz from the center of the subcarrier emitted by the transceiver 102.

Figure 6:
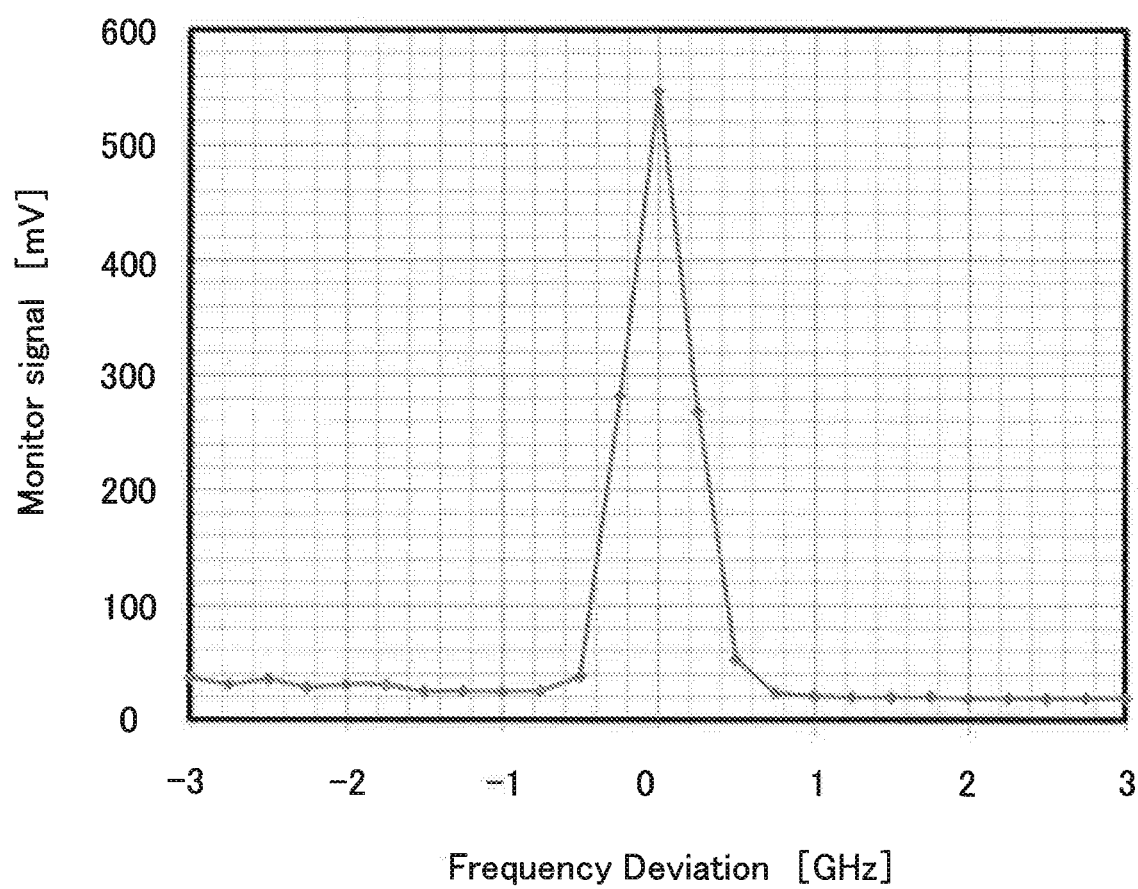
FIG. 6 is a diagram illustrating simulation results of a monitor signal for different frequency variations in accordance with the second exemplary embodiment of the present invention.

FIG. 6 represents simulation results of a monitor signal for different frequency variations. The simulation parameters are set for the case of the optical subcarriers represented on FIG. 5A. The represented monitor signal is the output of the filter 162 shown in FIG. 3 for a band pass of 100 MHz centered on the frequency difference between the imprinted frequency components 203 and 204 shown in FIG. 5A, i.e. 2.5 GHz. The monitor signal is plotted for variation of the frequency of the subcarrier plotted on the curve 202. It is clear that the monitor signal presents a maximum for the ideal case of zero frequency deviation with a very large slope and a high contrast. Clearly, the monitor signal enables to control the relative frequencies of multiplexed subcarriers very precisely. Furthermore, the implementation of the monitoring unit 160 requires low bandwidth electronics, and therefore it requires low cost and small space.

In this manner, the frequency deviation can be found without dithering the actual frequency of the carrier because the imprinted frequency is selected very precisely by the DSP and is relative to the center frequency of the related subcarrier. Therefore, the transmission system 100 according to the present exemplary embodiment enables to monitor and compensate the frequency deviation without dithering the frequency of monitored subcarriers because only the imprinted frequency component can be adjusted with precision. This enables to achieve better characteristics when the monitoring is performed because degradations due to frequency dithering of the subcarrier are avoided.

Figure 7:
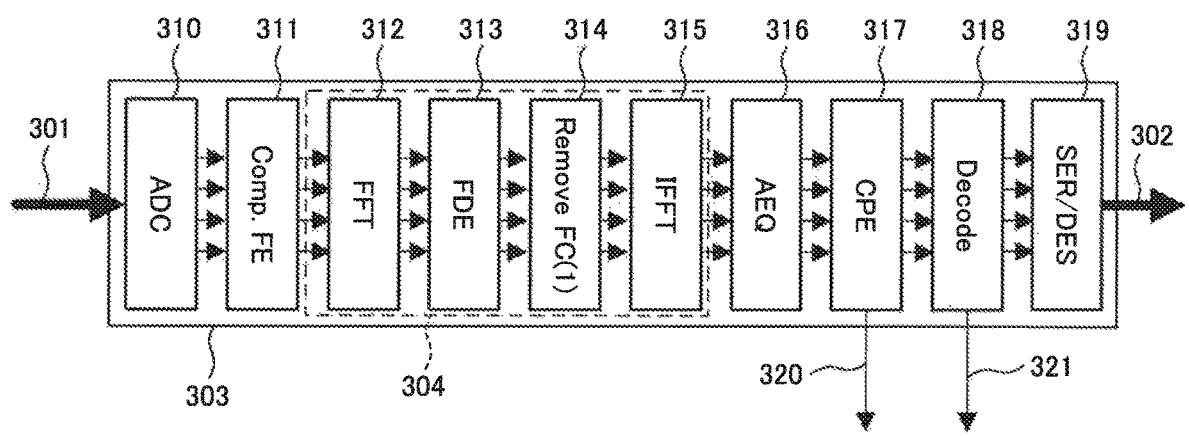
FIG. 7 is a block diagram illustrating the configuration of a DSP included in the transmission system in accordance with the second exemplary embodiment of the present invention.

FIG. 7 is a block diagram illustrating the configuration of a DSP 303, which can be implemented for the receiver DSP 149 shown in FIG. 3.

The DSP 303 generates a binary data flow 302 according to an analog electrical signal 301 provided from an optical receiver, which are digitalized, demodulated, and decoded by consecutive DSP units. First, an analog-to-digital converter (ADC) 310 digitalizes the analog electrical signal 301 after reception and provides tributaries XI, XQ, YI, and YQ for the consecutive DSP. Then a compensation unit 311 compensates for imperfections of the optical frontend including a skew between tributaries and a DC (direct current) offset. Then a frequency domain unit 304 performs frequency domain equalization with a fast Fourier transform unit 312, an equalizer 313 in the frequency domain which compensates impairments including chromatic dispersion, a special unit 314, and an inverse fast Fourier transform unit 315. An adaptive equalizer 316 performs, in time domain, polarization de-multiplexing and dynamic equalization of impairments including polarization mode dispersion. Then a carrier phase estimation (CPE) unit 317 performs carrier and phase recovery. A decoding unit 318 performs an FEC decoding process. Finally, a serializer/de-serializer 319 performs serializing/de-serializing on the decoded tributaries to provide the binary data flow 302.

The special unit 314 removes a specific frequency component FC(1), which is defined for a channel and an FFT block, or for a frame. The special unit 314 removes the frequency component imprinted on the transmitter side in order to achieve higher quality signal demodulation. The information on the frequency component and the timing of the imprinting can be provided by higher network layers, or can be included in a framing overhead of transmitting data. Alternatively, a frequency domain monitor implemented in the equalizer 313 can retrieve a higher amplitude frequency component and identify it as an FC.

The CPE unit 317 monitors the carrier and phase compensated constellation. The CPE unit 317 provides a monitor signal 320 which is relative to the distribution of constellation points and is used as a monitor of the demodulated signal quality.

The decoding unit 318 monitors the number of corrected errors by the FEC. The decoding unit 318 provides a monitor signal 321 on the received signal quality.

Next, an example of the operation of the transmission system 100 according to the present exemplary embodiment will be explained.

The transmission system 100 shown in FIG. 3 emits the optical signals illustrated in FIG. 5A. The central frequency of the subcarrier emitted by the transceiver 101 is represented by F1. The central frequency of the subcarrier emitted by the transceiver 102 is represented by F2, where F2 is larger than F1 and a nominal subcarrier spacing (F2−F1) is represented by FS. The imprinted frequency component FC1 is imprinted at the frequency of F1+FC1 by the DSP unit 130 in the transceiver 101. The imprinted frequency component FC2 is imprinted at the frequency of F2−FC2 by the DSP unit in the transceiver 102.

The receiver DSP 149 in the receiver for the subcarrier emitted by the transceiver 101 removes the frequency component FC1 using the special unit 314 shown in FIG. 7. According to the monitor signal shown in FIG. 6, the frequency F2 is adjusted through setting the laser frequency by the controller 163 shown in FIG. 3 in order to maximize the monitor signal at the output of the filter 162. The central frequency of the filter 162 is set to (FS−FC1−FC2). This enables to achieve higher system performance by compensating the frequency deviation among optical subcarriers.

Furthermore, because the order of the imprinted frequency component is equal to that of the symbol rate, the imprinted frequency component does not disrupt a potential transceiver control based on low frequency dither tones, such as an auto bias control for the polarization multiplexed IQ modulator 145. When the frequency FC1 is imprinted, the received Q factor is reduced from 9.8 dB to 9.7 dB, which is a negligible penalty compared to the degradation due to a linear crosstalk when the frequencies of the multiplexed subcarriers are not controlled.

For better system performance, when the frequency component FC1 is imprinted at F1+FC1 by the special adding unit 137 shown in FIG. 3, no frequency component is imprinted at F1−FC1. That is to say, the first optical component includes an optical component having an optical frequency obtained by adding the first frequency to a central frequency of the first optical carrier (F1+FC1), but excludes an optical component having an optical frequency obtained by subtracting the first frequency from the central frequency of the first optical carrier (F1−FC2).

Identically, no frequency component is imprinted at F2+FC2. That is to say, the second optical component includes an optical component having an optical frequency obtained by subtracting the second frequency from a central frequency of the second optical carrier which is larger than the central frequency of the first optical carrier (F2−FC2), but excludes an optical component having an optical frequency obtained by adding the second frequency to the central frequency of the second optical carrier (F2+FC2).

These conditions are realized by setting the coefficients of the special adding unit 137 according to the values of aXI1=aXI2=aXQ2 and aXQ1=−aXQ2 as shown in FIG. 4A. The identical setting is performed on the Y polarization of the subcarrier emitted by the transceiver 101 and also performed on both polarizations of the subcarrier emitted by the transceiver 102. This enables to suppress the negative frequency component which is not used for monitoring and to improve the efficiency of the monitoring.

For faster adjustments, the bandwidth of the filter 162 is adjusted from 1 GHz down to 100 MHz with a step of 100 MHz. At each step, the frequency deviation is compensated in order to maximize the monitor signal output by the filter 162. Once the optimization is performed at a filter setting, the bandwidth of the filter 162 is narrowed to achieve a better precision, and then the frequency is adjusted again. This enables to reduce the duration of adjustment steps and to achieve overall a better precision in the compensation of frequency deviation.

In one implementation of the present exemplary embodiment, the monitoring and adjustments are performed continuously. Alternatively, the monitoring and adjustments are performed at discrete timing, and a period of timings is determined to reduce the influence of the monitoring on the emitted spectrum.

For better system performance, the imprinted frequency component FC1 is chosen so as to be BR1/2<FC1<FS/2, and the frequency component FC2 is chosen so as to be BR2/2<FC2<FS/2, where BR1 and BR2 are the respective baud rates of the subcarriers emitted by the respective transceivers 101 and 102. That is to say, the first frequency (FC1) is larger than half of a first symbol rate of the first optical carrier (BR1/2) and smaller than half of a difference carrier frequency between the first optical carrier and the second optical carrier (FS/2). The second frequency (FC2) is larger than half of a second symbol rate of the second optical carrier (BR/2) and smaller than half of a difference carrier frequency between the first optical carrier and the second optical carrier (FS/2). In this manner, the imprinted frequency components are filtered and attenuated by an adapted filter at the receiver, and therefore they have negligible influence on the demodulated signal.

For better system performance, when the frequency deviation is monitored as DF1, the frequency adjustment is performed in frequency domain by the DSP unit 130 according to the coefficient setting of the frequency domain unit 134 as shown in FIG. 4B. That is to say, the carrier frequency is controlled by modifying coefficients of frequency domain equalization for at least one of the first data stream and the second data stream. This process enables very precise frequency shifting with fine digital precision indeed. Furthermore, the process is faster than that for adjusting the laser through the temperature and the current, and has better precision with no overshooting in the control.

For long term operation, if the total value of frequency deviation compensated through the frequency domain unit 134 and added to the subcarrier baud rate surpasses the bandwidth of the electronics in the transceiver 101, a part of total compensated DF1 is reduced by the DSP setting, and the frequency deviation is synchronously replaced by compensating the frequency of the laser 146.

For better system performance, the frequency component FC2 is set to FC2(0) at start. The frequency component FC2is varied over time. The value FC2(max) maximizes the value of the monitor signal. The frequency of the subcarrier emitted by the transceiver 102 is compensated by FC2(0)-FC2(max). That is to say, an initial value of the second frequency component FC2(0) is set, and the second frequency component FC2 is varied from the initial value FC2(0) to a scanned value FC2(max) at which to maximize the monitor signal. The carrier frequency of the second optical carrier F2 is controlled according to a difference between the initial value FC2(0) and the scanned value FC2(max). This enables to avoid transitional frequency deviations caused by a dither to monitor frequency deviations. In this manner, no additional crosstalk is caused during monitoring steps.

For a higher system capacity, a large number of subcarriers are multiplexed. For instance, 1 Tb/s payload is achieved with 5 subcarriers emitting 200 Gb/s payload with PM-16QAM modulation as illustrated on FIG. 5B. The compensation of frequency deviation between subcarriers is performed between two neighboring subcarriers. The process is repeated for each pair of neighboring subcarriers. When a pair of subcarriers is being monitored and the frequency components are imprinted on this pair, the other pairs are not monitored and the required frequency components are not imprinted on the other pairs.

For longer term operations, the monitoring is performed on each pair of neighboring subcarriers. Using the lower subcarrier frequency as a reference, the monitored frequency deviation is set to 0 for the first subcarrier of the lowest frequency and is DF(i) for the i-th subcarrier. The compensated frequencies are set to CF(i) for each subcarrier so as to be DF(i)=CF(i)−CF(i−1) for i>1. The coefficient CF(0) is chosen to minimize the sum of square of the values of CF(i). That is to say, the first optical carrier and the second optical carrier lie next to each other in frequency domain among a plurality of optical carriers included in the multiplexed optical signal. Each relative frequency between adjacent optical carriers is set according to the monitor signal, and each carrier frequency is determined so that the sum of squares of compensated frequency values can be minimized. Because the frequency deviations of the subcarriers are not correlated, this operation enables to reduce the total amount of correlated frequency.

For more precise frequency compensation, the information on the signal quality of the subcarrier having the lowest frequency can be obtained by the monitor signal 320 shown in FIG. 7 through higher network layers. The frequency of this subcarrier is set so as to optimize the received quality. The frequency deviation is compensated for all other subcarriers relatively to the lowest frequency subcarrier using imprinted frequency components on the multiplexed subcarriers by the monitoring unit 160 shown in FIG. 3. Alternatively, the frequency of the subcarrier is set so as to optimize the received quality of the highest frequency subcarrier. Alternatively, the information on the quality can be obtained from the monitor signal 321 shown in FIG. 7.

For a higher system capacity, super-Nyquist filtering is used. The super-Nyquist filtering is performed by the DSP unit 130. This enables subcarrier spacing to be lowered and the frequency deviation to be compensated by the monitoring unit 160 shown in FIG. 3.

For a better precision and a wider monitoring range, FC1 is chosen so as to be FC1=BR1*(0.5+FS/(BR1+BR2)) and FC2=BR2*(0.5+FS/(BR1+BR2)), which correspond to the average of half the symbol rate and the barycenter of the nominal central frequencies of the subcarriers pondered by the symbol rate of the subcarriers. That is to say, the first frequency FC1 is equal to a frequency obtained by adding the difference carrier frequency FS weighted with the first symbol rate BR1 and the second symbol rate BR2 to the half of the first symbol rate BR1/2. The second frequency FC2 is equal to a frequency obtained by adding the difference carrier frequency FS weighted with the first symbol rate BR1 and the second symbol rate BR2 to the half of the second symbol rate BR2/2. The frequency deviation of the subcarriers are monitored and compensated by the monitoring unit 160 and the controller 163 shown in FIG. 3. Because the imprinted frequency is higher than the half of the baud rate, an adapted filter included in the receiver DSP 149 at the receiver is able to reduce the influence on the imprinted frequency on demodulated signals. Furthermore, the allowed variation range with optimal performance becomes widest.

For continuous monitoring with optimal performance, the frequency FC1 is set to be FC1=BR1*FS/(BR1+BR2)−Fres and FC2=BR2*FS/(BR1+BR2)−Fres, which corresponds to the barycenter of the nominal frequency of the subcarrier pondered by the symbol rate of the corresponding subcarrier subtracted by the frequency resolution of the transmitter DSP of the transceiver. That is to say, the first frequency FC1 is equal to a frequency obtained by subtracting a frequency value corresponding to frequency resolution Fres in generating the first data stream from the difference carrier frequency FS weighted with the first symbol rate BR1 and the second symbol rate BR2. The second frequency FC2 is equal to a frequency obtained by subtracting a frequency value corresponding to frequency resolution Fres in generating the second data stream from the difference carrier frequency FS weighted with the first symbol rate BR1 and the second symbol rate BR2. Supposing the lowest possible frequency deviation occurs due to continuous monitoring, the imprinted frequency component is most attenuated by the adapted filter at the receiver and therefore less affects the signal demodulation.

As mentioned above, according to the present exemplary embodiment, an optical transmitter using multiplexed optical signals decreases in cost and in size which is able to control an optical carrier frequency with high precision.

[A Third Exemplary Embodiment]

Figure 8:
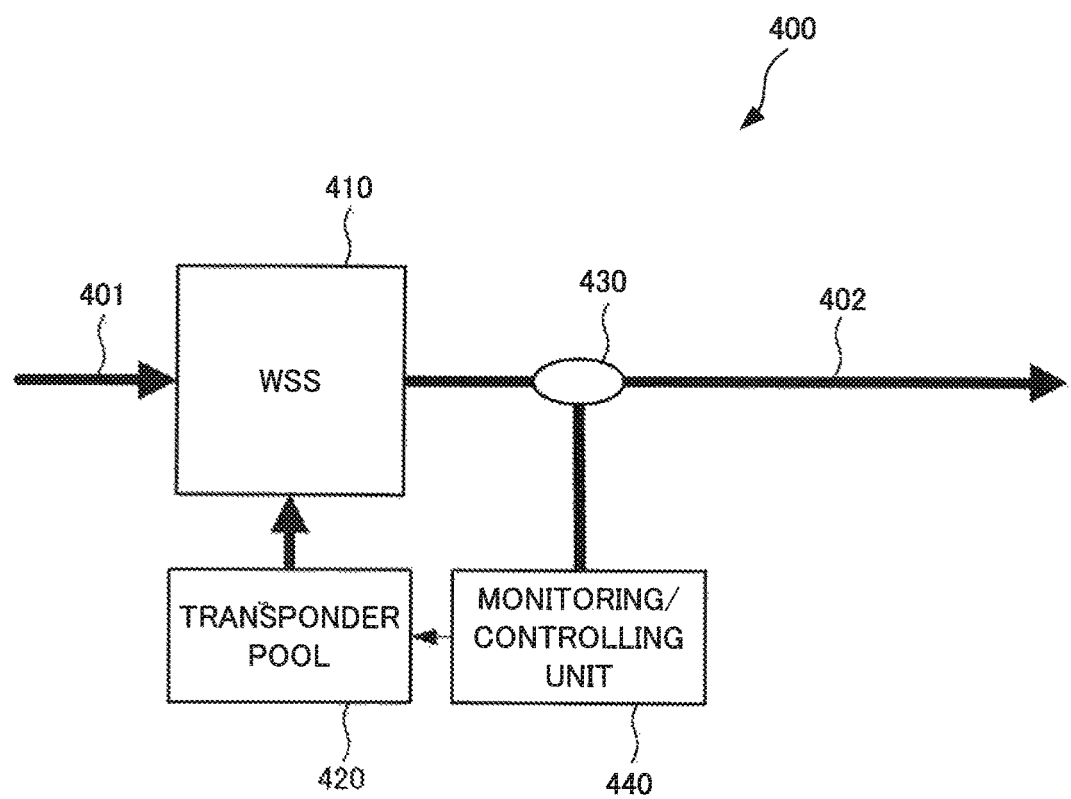
FIG. 8 is a block diagram illustrating the configuration of an optical node device in accordance with a third exemplary embodiment of the present invention.

Next, a third exemplary embodiment of the present invention will be described. FIG. 8 is a block diagram illustrating the configuration of an optical node device 400 according to the third exemplary embodiment of the present invention.

The optical node device 400 operates as a reconfigurable optical add-drop multiplexer (ROADM). Multiplexed subcarriers arrive at the optical node device 400 through a fiber 401, and the resulting signal is emitted through a fiber 402. The optical node device 400 includes a wavelength selective switch (WSS) 410 and a transponder pool 420. The optical node device 400 is featured by a signal tap 430 which corresponds to the optical coupler 152 and a monitoring and controlling unit 440 which corresponds to the monitoring unit 160 and the controller 163 shown in FIG. 3.

The optical carrier with five subcarriers multiplexed, whose spectra are identical to the plotted results in FIG. 5B, arrives through the fiber 401, for example. The subcarrier represented by the curve 242 shown in FIG. 5B is dropped by the WSS 410. Alternatively, another subcarrier with identical central frequency to that of the curve 242 is added from the transponder pool 420 through the WSS 410. At the transmitter side on the other side of the fiber 401, the frequency component FC1 represented by 243 is added on the spectrum of the subcarrier represented by the curve 241.

In the transponder pool 420, the frequency component FC2 represented by 244 is added to the subcarrier represented by 242. The monitoring and controlling unit 440 enables to control the frequency of the subcarrier represented by 242 in the transponder pool 420.

The optical node device 400 according to the present exemplary embodiment enables to control the frequency of added subcarriers at an ROADM and to perform multiplexing subcarriers with high frequency precision.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A method for controlling an optical carrier frequency, comprising: adding a first optical component to a first optical carrier; adding a second optical component to a second optical carrier; multiplexing the first optical carrier and the second optical carrier to generate a multiplexed optical signal;

monitoring the multiplexed optical signal to detect a monitor signal having a difference frequency between the first optical component and the second optical component; and controlling a carrier frequency of at least one of the first optical carrier and the second optical carrier according to the monitor signal.

(Supplementary note 2) The method for controlling an optical carrier frequency according to Supplementary note 1, wherein, the adding of the first optical component includes generating a first data stream by adding a first frequency component having a first frequency to a binary data stream, and modulating the first optical carrier based on the first data stream; the adding of the second optical component includes generating a second data stream by adding a second frequency component having a second frequency to a binary data stream, and modulating the second optical carrier based on the second data stream; the controlling of the carrier frequency includes controlling the carrier frequency so as to maximize the monitor signal; the first optical component includes an optical component having an optical frequency obtained by adding the first frequency to a central frequency of the first optical carrier, but excludes an optical component having an optical frequency obtained by subtracting the first frequency from the central frequency of the first optical carrier; and the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

(Supplementary note 3) The method for controlling an optical carrier frequency according to Supplementary note 2, wherein, the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

(Supplementary note 4) The method for controlling an optical carrier frequency according to Supplementary note 3, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

(Supplementary note 5) The method for controlling an optical carrier frequency according to Supplementary note 3, wherein, the first frequency is equal to a frequency obtained by subtracting a frequency value corresponding to frequency resolution in generating the first data stream from the difference carrier frequency weighted with the first symbol rate and the second symbol rate; and the second frequency is equal to a frequency obtained by subtracting a frequency value corresponding to frequency resolution in generating the second data stream from the difference carrier frequency weighted with the first symbol rate and the second symbol rate.

(Supplementary note 6) The method for controlling an optical carrier frequency according to any one of Supplementary notes 2, 3, 4, and 5, wherein, the adding of the second optical component includes setting an initial value of the second frequency component, and varying the second frequency component from the initial value to a scanned value at which to maximize the monitor signal; and the controlling of the carrier frequency includes controlling the carrier frequency of the second optical carrier according to a difference between the initial value and the scanned value.

(Supplementary note 7) The method for controlling an optical carrier frequency according to any one of Supplementary notes 2, 3, 4, 5, and 6, wherein, the controlling of the carrier frequency includes modifying coefficients of frequency domain equalization for at least one of the first data stream and the second data stream.

(Supplementary note 8) The method for controlling an optical carrier frequency according to any one of Supplementary notes 1, 2, 3, 4, 5, 6, and 7, wherein, the first optical carrier and the second optical carrier lie next to each other in frequency domain among a plurality of optical carriers included in the multiplexed optical signal; and the controlling of the carrier frequency includes setting each relative frequency between adjacent optical carriers according to the monitor signal, and determining each carrier frequency so that the sum of squares of compensated frequency values can be minimized.

(Supplementary note 9) An optical transmitter, comprising: optical signal generating means for adding a first optical component to a first optical carrier and adding a second optical component to a second optical carrier; multiplexing means for multiplexing the first optical carrier and the second optical carrier to generate a multiplexed optical signal; monitoring means for monitoring the multiplexed optical signal to detect a monitor signal having a difference frequency between the first optical component and the second optical component; and controlling means for controlling a carrier frequency of at least one of the first optical carrier and the second optical carrier according to the monitor signal.

(Supplementary note 10) The optical transmitter according to Supplementary note 9, wherein, the optical signal generating means generates a first data stream by adding a first frequency component having a first frequency to a binary data stream, and modulates the first optical carrier based on the first data stream; and generates a second data stream by adding a second frequency component having a second frequency to a binary data stream, and modulates the second optical carrier based on the second data stream; the controlling means controls the carrier frequency so as to maximize the monitor signal; the first optical component includes an optical component having an optical frequency obtained by adding the first frequency to a central frequency of the first optical carrier, but excludes an optical component having an optical frequency obtained by subtracting the first frequency from the central frequency of the first optical carrier; and the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

(Supplementary note 11) The optical transmitter according to Supplementary note 10, wherein, the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

(Supplementary note 12) The optical transmitter according to Supplementary note 11, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

(Supplementary note 13) An optical node device, comprising: switching means for switching optical signals wavelength-selectively; optical signal generating means for adding a first optical component to a first optical carrier and adding a second optical component to a second optical carrier, and multiplexing the first optical carrier and the second optical carrier to generate a multiplexed optical signal; monitoring and controlling means for monitoring the multiplexed optical signal to detect a monitor signal having a difference frequency between the first optical component and the second optical component, and controlling a carrier frequency of at least one of the first optical carrier and the second optical carrier according to the monitor signal.

(Supplementary note 14) The optical node device according to Supplementary note 13, wherein, the optical signal generating means generates a first data stream by adding a first frequency component having a first frequency to a binary data stream, and modulates the first optical carrier based on the first data stream; and generates a second data stream by adding a second frequency component having a second frequency to a binary data stream, and modulates the second optical carrier based on the second data stream; the monitoring and controlling means controls the carrier frequency so as to maximize the monitor signal; the first optical component includes an optical component having an optical frequency obtained by adding the first frequency to a central frequency of the first optical carrier, but excludes an optical component having an optical frequency obtained by subtracting the first frequency from the central frequency of the first optical carrier; and the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

(Supplementary note 15) The optical node device according to Supplementary note 14, wherein, the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

(Supplementary note 16) The optical node device according to Supplementary note 15, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

(Supplementary note 17) The optical transmitter according to any one of Supplementary notes 9, 10, 11, and 12, wherein a subcarrier included in the multiplexed optical signal is spectrally shaped with a Nyquist shape digital filter.

(Supplementary note 18) The optical transmitter according to any one of Supplementary notes 9, 10, 11, and 12, wherein a subcarrier included in the multiplexed optical signal is spectrally shaped with a filter whose bandwidth is narrower than a bandwidth of a Nyquist shape digital filter.

(Supplementary note 19) The method for controlling an optical carrier frequency according to any one of Supplementary notes 1, 2, 3, 4, 5, 6, 7, and 8, further comprising obtaining a received optical signal by receiving the multiplexed optical signal; filtering the received optical signal; and processing the received optical signal in digital domain to attenuate either of the first optical component and the second optical component.

(Supplementary note 20) The method for controlling an optical carrier frequency according to any one of Supplementary notes 1, 2, 3, 4, 5, 6, 7, 8, and 19, further comprising monitoring signal quality of a received optical signal obtained by receiving the multiplexed optical signal, a center frequency of the received optical signal included in one of a highest group and a lowest group of the multiplexed optical signal; and generating quality information on the signal quality; wherein the controlling of the carrier frequency includes controlling the carrier frequency using the quality information.

REFERENCE SIGNS LIST 10 optical transmitter
20 optical signal generating unit
30 multiplexer
40 monitoring unit
50 controller
100 transmission system
101, 102, 103, 10(N) transceiver
111, 112, 113, 121, 122, 123, 11(N), 12(N) binary data stream
130, 133, 139 DSP unit
131, 319 serializer/de-serializer
132 coder
134 frequency domain unit
135, 312 fast Fourier transform unit
136 tap filter
137 special adding unit
138, 315 inverse fast Fourier transform unit
140 DAC
141, 142, 143, 144 linear driver
145 polarization multiplexed IQ modulator
146, 147 laser
148 coherent receiver
149 receiver DSP
150 multiplexer
151 de-multiplexer
152 optical coupler
160 monitoring unit
161 photodiode
162 filter
163 controller
191 output
192 optical signal
301 analog electrical signal
302 binary data flow
303 DSP
304 frequency domain unit
310 ADC
311 compensation unit
313 equalizer
314 special unit
316 adaptive equalizer
317 CPE unit
318 decoding unit
320, 321 monitor signal
400 optical node device
401, 402 fiber
410 WSS
420 transponder pool
430 signal tap
440 monitoring and controlling unit

The invention claimed is:

1. A method for controlling an optical carrier frequency, comprising:
    adding a first optical component to a first optical carrier;
    adding a second optical component to a second optical carrier;
    multiplexing the first optical carrier and the second optical carrier to generate a multiplexed optical signal;
    monitoring the multiplexed optical signal to detect a monitor signal having a difference frequency between the first optical component and the second optical component; and
    controlling a carrier frequency of at least one of the first optical carrier and the second optical carrier according to the monitor signal.

2. The method for controlling an optical carrier frequency according to claim 1, wherein,
    the adding of the first optical component includes generating a first data stream by adding a first frequency component having a first frequency to a binary data stream, and modulating the first optical carrier based on the first data stream;
    the adding of the second optical component includes generating a second data stream by adding a second frequency component having a second frequency to a binary data stream, and modulating the second optical carrier based on the second data stream;
    the controlling of the carrier frequency includes controlling the carrier frequency so as to maximize the monitor signal;
    the first optical component includes an optical component having an optical frequency obtained by adding the first frequency to a central frequency of the first optical carrier, but excludes an optical component having an optical frequency obtained by subtracting the first frequency from the central frequency of the first optical carrier; and
    the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

3. The method for controlling an optical carrier frequency according to claim 2, wherein,
    the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

4. The method for controlling an optical carrier frequency according to claim 3, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

5. The method for controlling an optical carrier frequency according to claim 3, wherein, the first frequency is equal to a frequency obtained by subtracting a frequency value corresponding to frequency resolution in generating the first data stream from the difference carrier frequency weighted with the first symbol rate and the second symbol rate; and the second frequency is equal to a frequency obtained by subtracting a frequency value corresponding to frequency resolution in generating the second data stream from the difference carrier frequency weighted with the first symbol rate and the second symbol rate.

6. The method for controlling an optical carrier frequency according to claim 2, wherein, the adding of the second optical component includes setting an initial value of the second frequency component, and varying the second frequency component from the initial value to a scanned value at which to maximize the monitor signal; and the controlling of the carrier frequency includes controlling the carrier frequency of the second optical carrier according to a difference between the initial value and the scanned value.

7. The method for controlling an optical carrier frequency according to claim 2, wherein, the controlling of the carrier frequency includes modifying coefficients of frequency domain equalization for at least one of the first data stream and the second data stream.

8. The method for controlling an optical carrier frequency according to claim 1, wherein, the first optical carrier and the second optical carrier lie next to each other in frequency domain among a plurality of optical carriers included in the multiplexed optical signal; and the controlling of the carrier frequency includes setting each relative frequency between adjacent optical carriers according to the monitor signal, and determining each carrier frequency so that the sum of squares of compensated frequency values can be minimized.

9. An optical transmitter, comprising:

an optical signal generating section configured to add a first optical component to a first optical carrier and add a second optical component to a second optical carrier;

a multiplexer configured to multiplex the first optical carrier and the second optical carrier to generate a multiplexed optical signal;

a monitoring section configured to monitor the multiplexed optical signal to detect a monitor signal having a difference frequency between the first optical component and the second optical component; and a controller configured to control a carrier frequency of at least one of the first optical carrier and the second optical carrier according to the monitor signal.

10. The optical transmitter according to claim 9, wherein, the optical signal generating section generates a first data stream by adding a first frequency component having a first frequency to a binary data stream, and modulates the first optical carrier based on the first data stream; and generates a second data stream by adding a second frequency component having a second frequency to a binary data stream, and modulates the second optical carrier based on the second data stream;

the controller controls the carrier frequency so as to maximize the monitor signal;

the first optical component includes an optical component having an optical frequency obtained by adding the first frequency to a central frequency of the first optical carrier, but excludes an optical component having an optical frequency obtained by subtracting the first frequency from the central frequency of the first optical carrier; and the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

11. The optical transmitter according to claim 10, wherein, the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

12. The optical transmitter according to claim 11, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

13. An optical node device, comprising:

a switch configured to switch optical signals wavelength-selectively;

an optical signal generating section configured to add a first optical component to a first optical carrier and add a second optical component to a second optical carrier, and multiplex the first optical carrier and the second optical carrier to generate a multiplexed optical signal; and a monitoring and controlling section configured to monitor the multiplexed optical signal to detect a monitor signal having a difference frequency between the first optical component and the second optical component, and control a carrier frequency of at least one of the first optical carrier and the second optical carrier according to the monitor signal.

14. The optical node device according to claim 13, wherein, the optical signal generating section generates a first data stream by adding a first frequency component having a first frequency to a binary data stream, and modulates the first optical carrier based on the first data stream; and generates a second data stream by adding a second frequency component having a second frequency to a binary data stream, and modulates the second optical carrier based on the second data stream;

the monitoring and controlling section controls the carrier frequency so as to maximize the monitor signal;

the first optical component includes an optical component having an optical frequency obtained by adding the first frequency to a central frequency of the first optical carrier, but excludes an optical component having an optical frequency obtained by subtracting the first frequency from the central frequency of the first optical carrier; and the second optical component includes an optical component having an optical frequency obtained by subtracting the second frequency from a central frequency of the second optical carrier which is larger than the central frequency of the first optical carrier, but excludes an optical component having an optical frequency obtained by adding the second frequency to the central frequency of the second optical carrier.

15. The optical node device according to claim 14, wherein, the first frequency is larger than half of a first symbol rate of the first optical carrier and smaller than half of a difference carrier frequency between the first optical carrier and the second optical carrier; and the second frequency is larger than half of a second symbol rate of the second optical carrier and smaller than half of a difference carrier frequency between the first optical carrier and the second optical carrier.

16. The optical node device according to claim 15, wherein, the first frequency is equal to a frequency obtained by adding the difference carrier frequency weighted with the first symbol rate and the second symbol rate to the half of the first symbol rate; and the second frequency is equal to a frequency obtained by adding the difference carrier frequency weighted with the first symbol rate and the second symbol rate to the half of the second symbol rate.

17. The optical transmitter according to claim 9, wherein a subcarrier included in the multiplexed optical signal is spectrally shaped with a Nyquist shape digital filter.

18. The optical transmitter according to claim 9, wherein a subcarrier included in the multiplexed optical signal is spectrally shaped with a filter whose bandwidth is narrower than a bandwidth of a Nyquist shape digital filter.

19. The method for controlling an optical carrier frequency according to claim 1, further comprising obtaining a received optical signal by receiving the multiplexed optical signal;

filtering the received optical signal; and processing the received optical signal in digital domain to attenuate either of the first optical component and the second optical component.

20. The method for controlling an optical carrier frequency according to claim 1, further comprising monitoring signal quality of a received optical signal obtained by receiving the multiplexed optical signal, a center frequency of the received optical signal included in one of a highest group and a lowest group of the multiplexed optical signal; and generating quality information on the signal quality; wherein the controlling of the carrier frequency includes controlling the carrier frequency using the quality information.

* * * * *

UNITED STATES PATENT AND TRADEMARK OFFICE
CERTIFICATE OF CORRECTION

PATENT NO. : 10,567,078 B2
APPLICATION NO. : 16/070541
DATED : February 18, 2020
INVENTOR(S) : Emmanuel Le Taillandier De Gabory It is certified that error appears in the above-identified patent and that said Letters Patent is hereby corrected as shown below:

In the Specification

Column 1, Title, Line 3; After "FREQUENCY", insert --¶CROSS REFERENCE TO RELATED APPLICATIONS
This application is a National Stage of International Application No. PCT/JP2016/000224 filed Jan. 18, 2016.--

Signed and Sealed this
Fourteenth Day of July, 2020

Andrei Iancu
*Director of the United States Patent and Trademark Office*